(12) United States Patent
Sheath et al.

(10) Patent No.: US 11,162,423 B2
(45) Date of Patent: Nov. 2, 2021

(54) GAS TURBINE ENGINE

(71) Applicant: ROLLS-ROYCE plc, London (GB)

(72) Inventors: Michael J Sheath, Derby (GB);
Michael I Elliott, Derby (GB)

(73) Assignee: ROLLS-ROYCE PLC, London (GB)

(*) Notice: Subject to any disclaimer, the term of this patent is extended or adjusted under 35 U.S.C. 154(b) by 150 days.

(21) Appl. No.: 16/658,972

(22) Filed: Oct. 21, 2019

(65) Prior Publication Data
US 2020/0123920 A1 Apr. 23, 2020

(30) Foreign Application Priority Data
Oct. 22, 2018 (GB) ...................................... 1817153

(51) Int. Cl.
| | |
|---|---|
| *F02C 7/14* | (2006.01) |
| *F02C 7/12* | (2006.01) |
| *F02C 7/18* | (2006.01) |
| *F02C 7/141* | (2006.01) |
| *B64D 33/08* | (2006.01) |

(52) U.S. Cl.
CPC ................ *F02C 7/14* (2013.01); *F02C 7/12* (2013.01); *B64D 33/08* (2013.01); *F02C 7/141* (2013.01); *F02C 7/18* (2013.01); *F05D 2260/208* (2013.01)

(58) Field of Classification Search
CPC .................................................... B64D 33/08
See application file for complete search history.

(56) References Cited

U.S. PATENT DOCUMENTS

| | | | |
|---|---|---|---|
| 4,914,904 A | 4/1990 | Parnes et al. | |
| 10,378,556 B2 | 8/2019 | Zaccardi et al. | |
| 2006/0042223 A1* | 3/2006 | Walker .................. | F01D 25/162 60/39.08 |
| 2007/0264133 A1 | 11/2007 | Schwarz et al. | |

(Continued)

FOREIGN PATENT DOCUMENTS

| | | |
|---|---|---|
| EP | 3 106 646 A1 | 12/2016 |
| FR | 2 989 109 A1 | 10/2013 |

(Continued)

OTHER PUBLICATIONS

Combined Search and Examination Report of the Intellectual Property Office of the United Kingdom for GB1817153.8 with search date of Apr. 9, 2019.

(Continued)

*Primary Examiner* — Todd E Manahan
*Assistant Examiner* — Alyson Joan Harrington
(74) *Attorney, Agent, or Firm* — Oliff PLC

(57) ABSTRACT

A gas turbine engine comprising: an inner core nacelle; an outer fan nacelle; a bypass duct between the inner core nacelle and the outer fan nacelle; at least one bifurcation that extends between the inner core nacelle and the outer fan nacelle; and a cooling system, wherein the cooling system comprises at least one pipe for conveying a fluid to be cooled, the at least one pipe forming part of a fluid system of the engine, wherein the at least one pipe passes through the at least one bifurcation, and wherein at least a portion of one or more of the pipes is arranged to bring the fluid to be cooled into a heat exchanging relationship with a fluid, e.g. air, flowing in the bypass duct.

13 Claims, 3 Drawing Sheets

(56) References Cited

U.S. PATENT DOCUMENTS

| | | | |
|---|---|---|---|
| 2008/0016845 A1* | 1/2008 | Zysman | F02C 7/14 |
| | | | 60/226.1 |
| 2009/0097963 A1 | 4/2009 | Evans | |
| 2010/0300066 A1 | 12/2010 | Bulin et al. | |
| 2015/0023776 A1* | 1/2015 | Ribarov | F01D 9/065 |
| | | | 415/1 |
| 2015/0308339 A1* | 10/2015 | Forcier | F02K 3/115 |
| | | | 60/204 |
| 2016/0369697 A1 | 12/2016 | Schwarz et al. | |
| 2017/0002685 A1* | 1/2017 | Todorovic | F01D 25/12 |
| 2017/0184024 A1 | 6/2017 | Sennoun | |
| 2018/0238270 A1 | 8/2018 | Roberge | |

FOREIGN PATENT DOCUMENTS

| | | |
|---|---|---|
| GB | 2546422 A | 7/2017 |
| WO | 2014/130103 A2 | 8/2014 |

OTHER PUBLICATIONS

Mar. 5, 2020 Search Report issued in European Patent Application No. 19 20 0778.

* cited by examiner

GAS TURBINE ENGINE

CROSS-REFERENCE TO RELATED APPLICATIONS

This specification is based upon and claims the benefit of priority from United Kingdom patent application number GB 1817153.8 filed on Oct. 22, 2018, the entire contents of which are incorporated herein by reference.

BACKGROUND

Field of the Disclosure

The present disclosure relates to gas turbine engines, in particular aircraft gas turbine engines.

Description of the Related Art

Current gas turbine engines often comprise cooling systems for one or more fluids, wherein the fluid or fluids to be cooled is/are employed in various engine systems. Multiple components of gas turbine engines generate heat and fluids are often used to transfer this heat away from the components.

Heat exchangers are commonly used within gas turbine engines as a means for cooling a fluid. Heat exchangers often require a large surface area in order to maximise the heat transfer from the fluid to be cooled to the surroundings. The often small amount of available room within a gas turbine engine means packaging of a heat exchanger can be problematic and limited airflow over such heat exchangers can result in a poor rate of cooling.

United States patent application US 2016/369697 A1 discloses a cooled cooling air system for a turbofan engine.

It would be beneficial to provide an improved means for cooling one or more fluids within a gas turbine engine.

SUMMARY

According to a first aspect there is provided a gas turbine engine comprising: an inner core nacelle; an outer fan nacelle; a bypass duct defined at least in part by the inner core nacelle and the outer fan nacelle; at least one bifurcation that extends between the inner core nacelle and the outer fan nacelle; and a cooling system, wherein the cooling system comprises at least one pipe for conveying a fluid to be cooled, the at least one pipe forming part of a fluid system of the engine, wherein the at least one pipe passes through the at least one bifurcation, and wherein at least a portion of one or more of the pipes is arranged to bring the fluid to be cooled into a heat exchanging relationship with a fluid, e.g. air, flowing in the bypass duct.

By "heat exchanging relationship" may be meant that the fluid to be cooled and the fluid flowing in the bypass duct are separated only by a thermally conductive wall. Accordingly, heat may be exchanged between the fluid to be cooled and the fluid flowing in the bypass duct across the thermally conductive wall. The fluid flowing in the bypass duct may generally be significantly colder than the fluid to be cooled.

By "pipe" is meant a conduit that may or may not vary in cross-section and may or may not be round in cross-section. In some embodiments the cross-section of the pipe(s) can be shaped to maximise contact with the thermally conductive wall.

The thermally conductive wall may comprise, or consist essentially of, a portion of one or more of the pipes. The thermally conductive wall may comprise, or consist essentially of, a portion of an outer surface of one or more of the bifurcations. The thermally conductive wall may comprise, or consist essentially of, a thermally conductive material. The thermally conductive material may comprise, or consist essentially of, a metal or an alloy. The metal or the alloy may comprise copper, aluminium, nickel or brass.

The thermally conductive material may have a thermal conductivity of at least 10 W/mK, at least 50 W/mK or at least 100 W/mK.

The at least one pipe containing the fluid to be cooled may comprise any suitable material, or any combination of any suitable materials. The pipe(s) may comprise, or consist essentially of, a metal, an alloy, a polymer or a rubber, for example. The portion(s) of the pipe(s) arranged to bring the fluid to be cooled into the heat exchanging relationship with the fluid flowing in the bypass duct may comprise, or consist essentially of, a thermally conductive material. The thermal conductivity of the thermally conductive material may be at least 10 W/mK, at least 50 W/mK or at least 100 W/mK.

One or more of the portions of the pipe(s) arranged to bring the fluid to be cooled into the heat exchanging relationship with the fluid flowing in the bypass duct may be disposed at least partially within the bypass duct. The pipe(s) containing the fluid to be cooled may protrude from the bifurcation and/or may extend out of the bifurcation into the bypass duct and then back into the bifurcation.

The portion(s) of the pipe(s) arranged to bring the fluid to be cooled into the heat exchanging relationship with the fluid flowing in the bypass duct, e.g. protruding from the bifurcation and/or extending into the bypass duct, may be arranged at least in part substantially parallel, substantially perpendicular or at an angle to the predominant direction of fluid, e.g. air, flow in the bypass duct.

The portion(s) of the pipe(s) arranged to bring the fluid to be cooled into the heat exchanging relationship with the fluid flowing in the bypass duct, e.g. protruding from the bifurcation and/or extending into the bypass duct, may comprise one or more bends. For instance, the portion(s) of the pipe(s) arranged to bring the fluid to be cooled into the heat exchanging relationship with the fluid flowing in the bypass duct, e.g. protruding from the bifurcation and/or extending into the bypass duct, may comprise a loop, a spiral, a helical portion or any other suitable arrangement.

At least part of the portion(s) of the pipe(s) extending into the bypass duct may be disposed a distance away from an external surface of the bifurcation. Hence, there may be a gap between the external surface of the bifurcation and the portion(s) of the pipe(s) extending into the bypass duct. Such a part or parts of the portion(s) of the pipe(s) extending into the bypass duct may be described as being suspended in the bypass duct. Providing portion(s) of the pipe(s) extending into the bypass duct that is/are suspended in the bypass duct may facilitate heat exchange between the fluid to be cooled and the fluid flowing in the bypass duct, since there may be heat exchange in all (radial) directions.

One or more of the portions of the pipe(s) arranged to bring the fluid to be cooled into the heat exchanging relationship with the fluid flowing in the bypass duct may not be disposed within the bypass duct. The pipe(s) containing the fluid to be cooled may not extend out of the bifurcation into the bypass duct. For instance, the portion(s) of the pipe(s) arranged to bring the fluid to be cooled into the heat exchanging relationship with the fluid flowing in the bypass duct may be in thermal contact with an external surface of the bifurcation. The portion(s) of the pipe(s) arranged to bring the fluid to be cooled into the heat exchanging relationship with the fluid flowing in the bypass duct may be disposed flush with the external surface of the bifurcation. Thus, in effect, the portion(s) of the pipe(s) may form part of the external surface of the bifurcation. By one or more of the portion(s) of the pipe(s) not protruding significantly from the external surface of the bifurcation and/or extending into the bypass duct, disturbance of fluid, e.g., air, flow through the bypass duct may be minimised. Aerodynamics of the bifurcation(s) may not be adversely affected.

The bifurcation(s) may for example by a lower bifurcation and/or an upper bifurcation. Either or both of the lower bifurcation and the upper bifurcation may have at least one pipe forming part of a fluid system of the engine passing therethrough, wherein at least a portion of one or more of the pipes is arranged to bring the fluid to be cooled into a heat exchanging relationship with a fluid, e.g. air, flowing in the bypass duct.

The fluid to be cooled may comprise an oil.

The fluid to be cooled may comprise a gas, e.g. air.

The fluid to be cooled may comprise a fuel.

The at least one pipe may contain the fluid to be cooled.

The portion(s) of one or more the pipes arranged to bring the fluid to be cooled into the heat exchanging relationship with the fluid flowing in the bypass duct may be arranged to convey the fluid to be cooled in a direction generally opposite or counter to a prevailing direction of fluid flow in the bypass duct.

One of more of the pipes for conveying the fluid to be cooled may comprise one or more manifolds or junctions, e.g. to split the flow of the fluid to be cooled into a plurality of smaller flows, which may then be brought into the heat exchanging relationship with the fluid flowing in the bypass duct.

The gas turbine engine may be an aircraft gas turbine engine. The gas turbine engine may be a turbofan gas turbine engine. The gas turbine engine may be an ultra-high bypass ratio (UHBR) aircraft engine.

The gas turbine engine may comprise:

an engine core comprising a turbine, a compressor, and a core shaft connecting the turbine to the compressor;

a fan located upstream of the engine core, the fan comprising a plurality of fan blades; and, optionally, a gearbox that receives an input from the core shaft and outputs drive to the fan so as to drive the fan at a lower rotational speed than the core shaft.

The turbine may be a first turbine, the compressor may be a first compressor, and/or the core shaft may be a first core shaft.

The engine core may further comprise a second turbine, a second compressor, and a second core shaft connecting the second turbine to the second compressor.

The second turbine, second compressor, and second core shaft may be arranged to rotate at a higher rotational speed than the first core shaft.

The gas turbine engine may be formed by manufacturing an entirely new gas turbine engine or by modifying a pre-existing gas turbine engine.

A second aspect provides a cooling system for a gas turbine engine comprising an inner core nacelle, an outer fan nacelle, a bypass duct defined at least in part by the inner core nacelle and the outer fan nacelle and at least one bifurcation that extends between the inner core nacelle and the outer fan nacelle, wherein the cooling system comprises at least one pipe for conveying a fluid to be cooled, the at least one pipe forming part of a fluid system of the engine, wherein the at least one pipe is arranged to pass through the at least one bifurcation, and wherein at least a portion of one or more of the pipes is arranged to bring the fluid to be cooled into a heat exchanging relationship with a fluid, e.g. air, flowing in the bypass duct.

The cooling system may be installed during manufacture or assembly of an entirely new gas turbine engine. The cooling system may be installed during maintenance and/or refurbishment of a pre-existing gas turbine engine.

A third aspect provides a method of cooling a fluid in a gas turbine engine comprising:

conveying a fluid to be cooled along at least one pipe, the at least one pipe forming part of a fluid system of the engine, wherein at least a portion of the at least one pipe passes through a bifurcation extending between an inner core nacelle and an outer fan nacelle, a bypass duct being defined at least in part by the inner core nacelle and the outer fan nacelle, and wherein at least a portion of one or more of the pipes is arranged to bring the fluid to be cooled into a heat exchanging relationship with a fluid, e.g. air, flowing in the bypass duct.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by an outer fan nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds).

Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling.

For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Embodiments will now be described by way of example only, with reference to the Figures.

Figure 1:
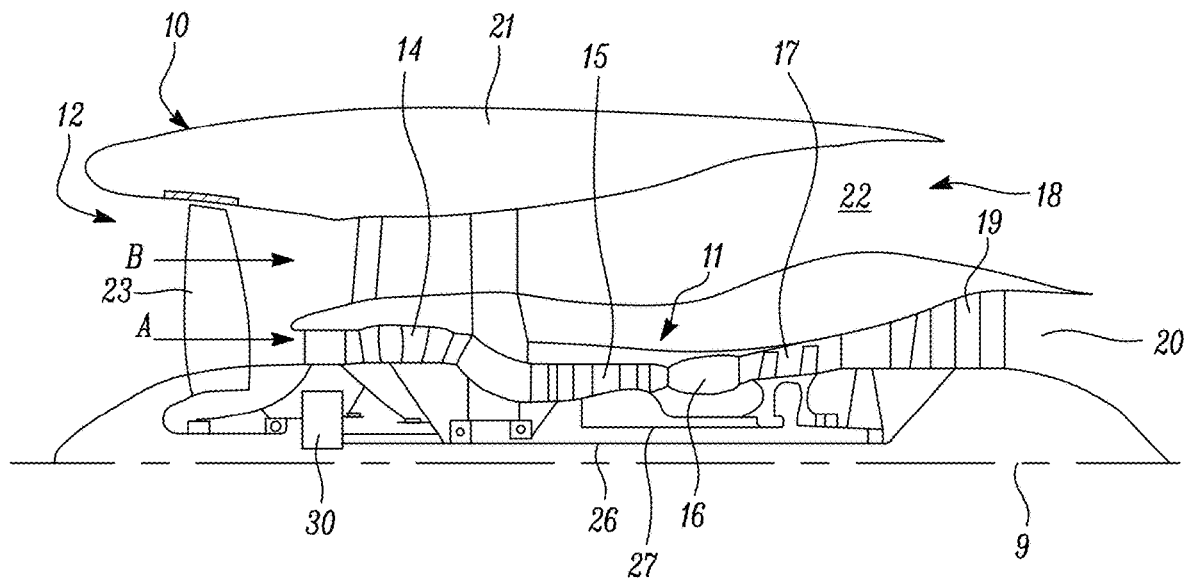
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. An outer fan nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
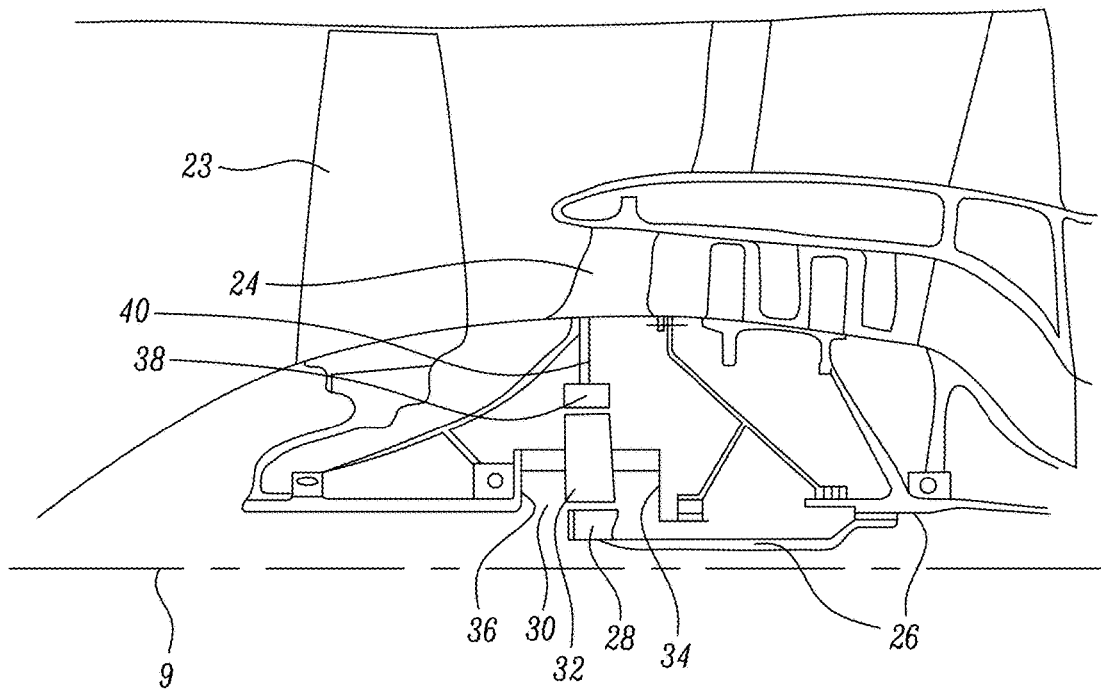
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
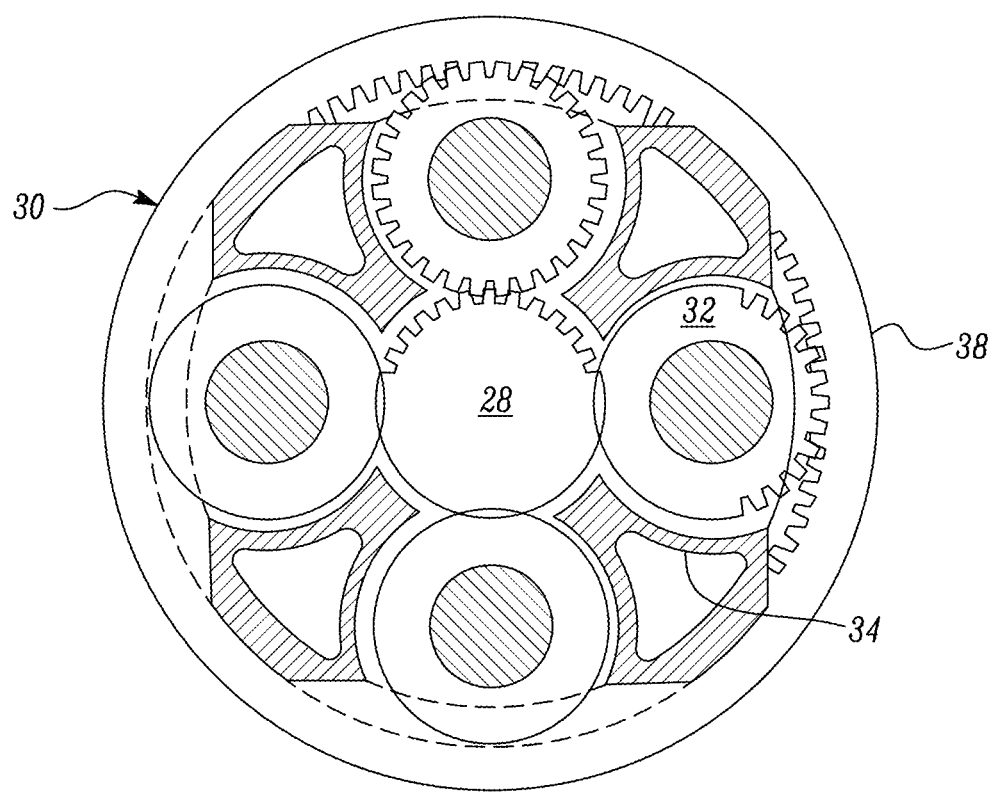
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine turbofan engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
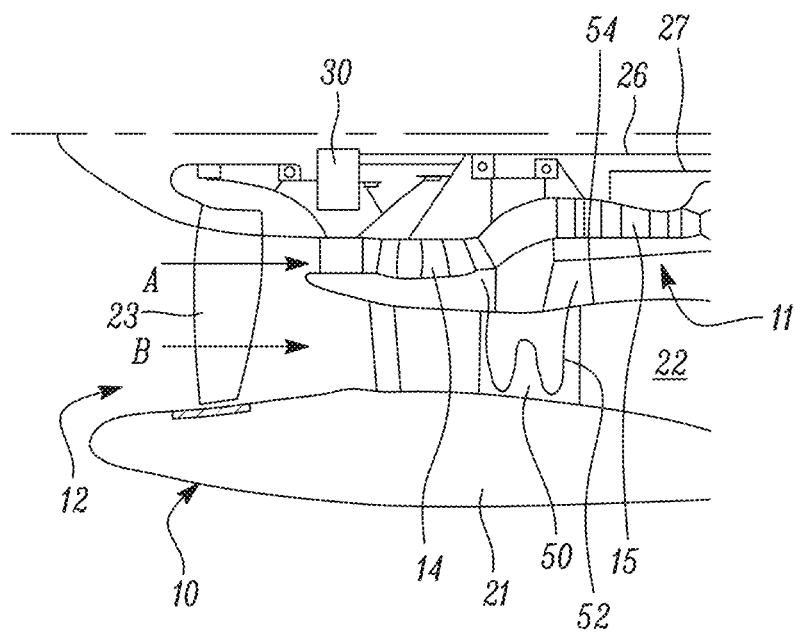
FIG. 4 is a close up sectional side view of an upstream portion of a gas turbine engine.

FIG. 4 is a close-up sectional side view of an upstream portion of the gas turbine engine 10 illustrated in FIG. 1. A bifurcation 50 extends between the core nacelle 54 and outer fan nacelle 21. The bifurcation 50 extends across the bypass duct 22 and therefore is exposed to the bypass airflow B during operation of the gas turbine engine 10. The bifurcation 50 may for example be a lower bifurcation or an upper bifurcation.

A pipe 52 for conveying a fluid to be cooled from the engine core 11 extends from the core nacelle 54, into the bifurcation 50, and back into the core nacelle 54. A portion of the pipe 52 is passes out of the bifurcation 50 into the bypass duct 22, thereby bringing the fluid to be cooled into a heat exchanging relationship with the bypass airflow B.

Figure 5:
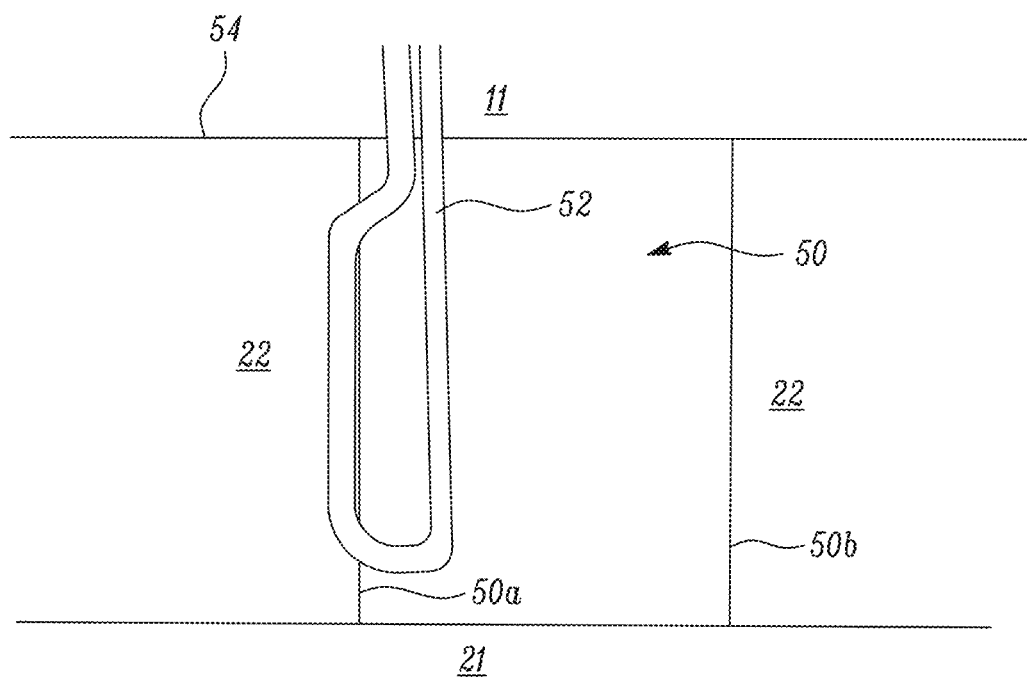
FIG. 5 is a close up sectional front view of a bifurcation of a gas turbine engine.

FIG. 5 is a close-up sectional front view of the bifurcation 50 of the gas turbine engine 10. The bifurcation extends across the bypass duct 22 from the core nacelle 54 to the outer fan nacelle 21. The bifurcation 50 comprises a cavity enclosed by the walls 50a and 50b. The pipe 52 extends into the bifurcation 50 from the core nacelle 54. The pipe 52 then passes through a first aperture in the bifurcation wall 50a into the bypass duct 22, extends for a distance outside the bifurcation 50, before passing through a second aperture in the bifurcation wall 50a. The pipe 52 then extends back into the core nacelle 54. A portion of the pipe 52 is thus disposed within the bypass duct 22, thereby bringing the fluid to be cooled into a heat exchanging relationship with the fluid flowing in the bypass duct 22.

During operation of the gas turbine engine 10, a fluid to be cooled will flow through the pipe 52 from the engine core 11. The fluid will then flow through the portion of the pipe 52 that is arranged within the bypass duct 22. The bypass airflow B will flow over, and contact directly, the portion of the pipe 52 that is arranged within the bypass duct 22. The bypass airflow B will be at a significantly lower temperature than the fluid to be cooled. Heat from the fluid to be cooled flowing through the pipe 52 will conduct through the wall of the pipe 52 and be transferred to the bypass airflow B coming into contact with the pipe 52. Fluid flowing in the pipe 52 then re-enters the bifurcation 50 at a lower temperature. The cooled fluid is then returned to the core 11 where it may be utilised in an engine system.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine comprising:
   an inner core nacelle;
   an outer fan nacelle;
   a bypass duct defined at least in part by the inner core nacelle and the outer fan nacelle;
   at least one bifurcation that extends between the inner core nacelle and the outer fan nacelle; and
   a cooling system, wherein
      the cooling system comprises at least one pipe for conveying a fluid to be cooled,
      the at least one pipe forms part of a fluid system of the engine,
      the at least one pipe passes through the at least one bifurcation,
      at least a portion of the at least one pipe is arranged to bring the fluid to be cooled into a heat exchanging relationship with a fluid flowing in the bypass duct, and
      the at least a portion of the at least one pipe is arranged upstream of an upstream end of the at least one bifurcation.

2. The gas turbine engine of claim 1, wherein, when in the heat exchanging relationship, the fluid to be cooled and the fluid flowing in the bypass duct are separated only by a thermally conductive wall.

3. The gas turbine engine of claim 2, wherein the thermally conductive wall comprises, or consists essentially of, the at least a portion of the at least one pipe.

4. The gas turbine engine of claim 2, wherein the thermally conductive wall comprises, or consists essentially of, a portion of an outer surface of the at least one bifurcation.

5. The gas turbine engine of claim 1, wherein the at least a portion of the at least one pipe that is arranged to bring the fluid to be cooled into the heat exchanging relationship with the fluid flowing in the bypass duct is disposed at least partially within the bypass duct.

6. The gas turbine engine of claim 1, wherein the at least a portion of the at least one pipe that is arranged to bring the fluid to be cooled into the heat exchanging relationship with the fluid flowing in the bypass duct is arranged at least in part parallel, perpendicular or at an angle to a predominant direction of fluid flow in the bypass duct.

7. The gas turbine engine of claim 1, wherein the at least a portion of the at least one pipe that is arranged to bring the fluid to be cooled into the heat exchanging relationship with the fluid flowing in the bypass duct comprises one or more bends.

8. The gas turbine engine of claim 1, wherein a second portion of the at least one pipe is not disposed within the bypass duct.

9. The gas turbine engine of claim 1, further comprising:
   an engine core comprising a turbine, a compressor, and a core shaft connecting the turbine to the compressor; and
   a fan located upstream of the engine core, the fan comprising a plurality of fan blades.

10. The gas turbine engine of claim 9, further comprising a gearbox that receives an input from the core shaft and outputs drive to the fan so as to drive the fan at a lower rotational speed than the core shaft.

11. A cooling system for a gas turbine engine comprising an inner core nacelle, an outer fan nacelle, a bypass duct defined at least in part by the inner core nacelle and the outer fan nacelle and at least one bifurcation that extends between the inner core nacelle and the outer fan nacelle, the cooling system comprising:

at least one pipe that conveys a fluid to be cooled, the at least one pipe forming part of a fluid system of the engine, wherein:

the at least one pipe is arranged to pass through the at least one bifurcation, at least a portion of the at least one pipe is arranged to bring the fluid to be cooled into a heat exchanging relationship with a fluid flowing in the bypass duct, and the at least a portion of the at least one pipe is arranged upstream of an upstream end of the at least one bifurcation.

12. A method of cooling a fluid in a gas turbine engine comprising:

conveying a first fluid to be cooled along at least one pipe, the at least one pipe forming part of a fluid system of the engine, wherein:

at least a portion of the at least one pipe passes through a bifurcation extending between an inner core nacelle and an outer fan nacelle, a bypass duct being defined at least in part by the inner core nacelle and the outer fan nacelle, at least a portion of the at least one pipe is arranged to bring the first fluid to be cooled into a heat exchanging relationship with a second fluid flowing in the bypass duct, and the at least a portion of the at least one pipe is arranged upstream of an upstream end of the at least one bifurcation.

13. The gas turbine engine of claim 1, wherein the at least one pipe is a tubular member that extends from within the inner core nacelle, into the at least one bifurcation, and back into the inner core nacelle.

* * * * *